(12) United States Patent
Chan (10) Patent No.: US 10,230,721 B2
(45) Date of Patent: Mar. 12, 2019

(54) AUTHENTICATION SERVER, AUTHENTICATION SYSTEM AND METHOD

(71) Applicant: Tai Chiu Chan, Hong Kong (HK)

(72) Inventor: Tai Chiu Chan, Hong Kong (HK)

( * ) Notice: Subject to any disclaimer, the term of this patent is extended or adjusted under 35 U.S.C. 154(b) by 0 days.

(21) Appl. No.: 15/952,231

(22) Filed: Apr. 12, 2018

(65) Prior Publication Data

US 2018/0302401 A1 Oct. 18, 2018

Related U.S. Application Data

(63) Continuation-in-part of application No. PCT/CN2018/073888, filed on Jan. 23, 2018.

(60) Provisional application No. 62/452,996, filed on Feb. 1, 2017.

(51) Int. Cl.
*H04L 29/06* (2006.01)
*H04L 9/32* (2006.01)

(52) U.S. Cl.
CPC ............ *H04L 63/0853* (2013.01); *H04L 9/32* (2013.01); *H04L 63/083* (2013.01)

(58) Field of Classification Search
CPC ..... H04L 9/32; H04L 63/0853; H04L 63/083; G06K 9/68; H04M 1/66; H04K 1/00; G06Q 20/32; G06Q 99/00; H04W 4/00

USPC ............ 726/7; 455/411; 382/218, 209, 214, 382/217; 705/67, 71
See application file for complete search history.

(56) References Cited

U.S. PATENT DOCUMENTS

| | | | | |
|---|---|---|---|---|
| 2006/0212407 A1* | 9/2006 | Lyon | ...................... | G06Q 20/04 705/71 |
| 2012/0028609 A1* | 2/2012 | Hruska | .............. | G06Q 20/3674 455/411 |

FOREIGN PATENT DOCUMENTS

CN 102930435 A 2/2013

* cited by examiner

*Primary Examiner* — Thanhnga B Truong (57) ABSTRACT

The present disclosure discloses an authentication server, an authentication system and an authentication method. The authentication server includes an information acquisition module and an identity authentication module. The information acquisition module obtains telecommunication user information from a telecommunications server, and obtains merchant user information from a merchant server, based on an end-user's cell phone number. The identity authentication module compares the telecommunication user information with the merchant user information according to a predetermined authentication mode, and returns a comparison result to the merchant server. The authentication method of the present disclosure can obtain better security protection, fast authentication, better user experience, and avoid security problem of repeat SMS interception.

5 Claims, 7 Drawing Sheets

AUTHENTICATION SERVER, AUTHENTICATION SYSTEM AND METHOD

CROSS REFERENCE TO RELATED APPLICATIONS

The present application is a Continuation-In-Part Application of PCT Application No. PCT/CN2018/073888 filed on Jan. 23, 2018, which claims the benefit of U.S. Provisional Patent Application No. 62/452,996 filed on Feb. 1, 2017. All the above are hereby incorporated by reference.

TECHNICAL FIELD

The present disclosure relates to identity authentication technology, and in particular to an authentication server, an authentication system and method.

BACKGROUND

In today's life, people enjoy the use of intelligent, mobile, or Internet of Things (IoT) devices, e.g. the convenience achieved by using various services and applications of mobile phones, smart watches and other wearable devices. However, these services also create lingering security and privacy issues. These issues include the following: 1) people are less aware of security when using various devices, resulting in the leak of personal information, and 2) variety of trojan or virus with the purpose of silently intercepting sign-in information of the public and pervasive attack on people's various devices in order to steal the wealth of the public. In addition, the application softwares of many devices collect user information and personal information without the user's knowledge.

Although there are some identity authentication technologies to protect user's information, however, the existing identity authentication technologies, such as SMS authentication, biometric authentication, etc. have inherent deficiencies. SMS authentication is easy to be intercepted by trojan. Biometric authentication has problems such as personal privacy, no secrecy (easy to copy), cannot convert in case of loss of biometric characteristics, etc. If it is combined with other authentication methods, it causes poor experience to the user. Many authentication techniques or methods require the user's cooperation. In the absence of independent third-party verification, true and false of the user cannot be 100% determined. It also needs to find out how to avoid misuse of the authentication mechanism and stealing of user's personal information, and how to prevent mobile terminals or devices from trojan, virus, and middleman invasion, or crack of mobile terminal software. Hence, security and personal privacy issues always exist.

SUMMARY

According to one aspect, there is provided an authentication server, including:
an information acquisition module, which obtains telecommunication user information from a telecommunications server, and obtains merchant user information from a merchant server, based on an end-user's cell phone number; and
an identity authentication module, which compares the telecommunication user information with the merchant user information according to a predetermined authentication mode, and returns a comparison result to the merchant server.

In one embodiment, the authentication mode includes: full cell phone number authentication mode, half cell phone number authentication mode, full cell phone number and full user information authentication mode, and half cell phone number and half user information authentication mode.

According to another aspect, there is provided an authentication system, including: a telecommunications server; an authentication server; and a merchant server, wherein the telecommunications server provides telecommunication user information to the authentication server based on an end-user's cell phone number, the merchant server provides merchant user information to the authentication server based on the end-user's cell phone number, and the authentication server compares the telecommunication user information obtained from the telecommunications server, and the merchant user information obtained from the merchant server according to a predetermined authentication mode, and returns a comparison result to the merchant server.

In one embodiment, the authentication mode includes: full cell phone number authentication mode, half cell phone number authentication mode, full cell phone number and full user information authentication mode, and half cell phone number and half user information authentication mode.

In one embodiment, when in the half cell phone number authentication mode, or the half cell phone number and half user information authentication mode, the merchant server continues to carry out comparison of a complete cell phone number and user information.

In one embodiment, the telecommunications server uses a method of adding user information to a webpage to provide the telecommunication user information to the authentication server, or the authentication server obtains the telecommunication user information from the telecommunications server according to the end-user's IP or IP+Port message.

According to yet another aspect, there is provided an authentication method, including: providing, by a merchant server, merchant user information to an authentication server based on an end-user's cell phone number; providing, by a telecommunications server, telecommunication user information to the authentication server based on the end-user's cell phone number; and carrying out, by the authentication server, comparison of the telecommunication user information obtained from the telecommunications server and the merchant user information obtained from the merchant server according to a predetermined authentication mode, and returning a comparison result to the merchant server.

In one embodiment, the authentication mode includes: full cell phone number authentication mode, half cell phone number authentication mode, full cell phone number and full user information authentication mode, and half cell phone number and half user information authentication mode.

In one embodiment, when in the half cell phone number authentication mode, or the half cell phone number and half user information authentication mode, the merchant server continues to carry out comparison of a complete cell phone number and user information.

In one embodiment, the authentication method includes:
generating, by the merchant server, a code comparison request code which contains a merchant abbreviation, the end-user's cell phone number, a time stamp and a random code;
sending the code comparison request code and its corresponding merchant user information to the authentication server according to the authentication mode;
generating a case code which contains an authentication abbreviation, a merchant identification code, a time stamp and a random code, after the authentication server confirms the merchant's identity and authority, forming a uniform resource locator which contains an encrypted case code, and sending information of the case code, the uniform resource locator, and remaining right to use or usage quota to the merchant server;

transferring, by the merchant server, the uniform resource locator to the user's terminal;

providing, by the telecommunications server, corresponding telecommunication user information to the authentication server according to a request by the end-user based on the uniform resource locator;

carrying out, by the authentication server, comparison of the telecommunication user information and the merchant user information based on the encrypted case code obtained from the uniform resource locator after successful completion of decryption and checking, and sending a comparison result to the merchant server; and carrying out corresponding processing according to the authentication mode after the merchant server obtains the comparison result from the authentication server.

The authentication method disclosed in the present application can provide better security protection, fast authentication, better user experience, and can avoid the security problem of repeat SMS interception.

BRIEF DESCRIPTION OF THE DRAWINGS

The present disclosure will be elaborated below in more detail based on schematic diagrams of each of the illustrative embodiments.

DETAILED DESCRIPTION

The embodiments of the authentication server, authentication system and authentication method of the present disclosure are described in detail below.

Figure 1:
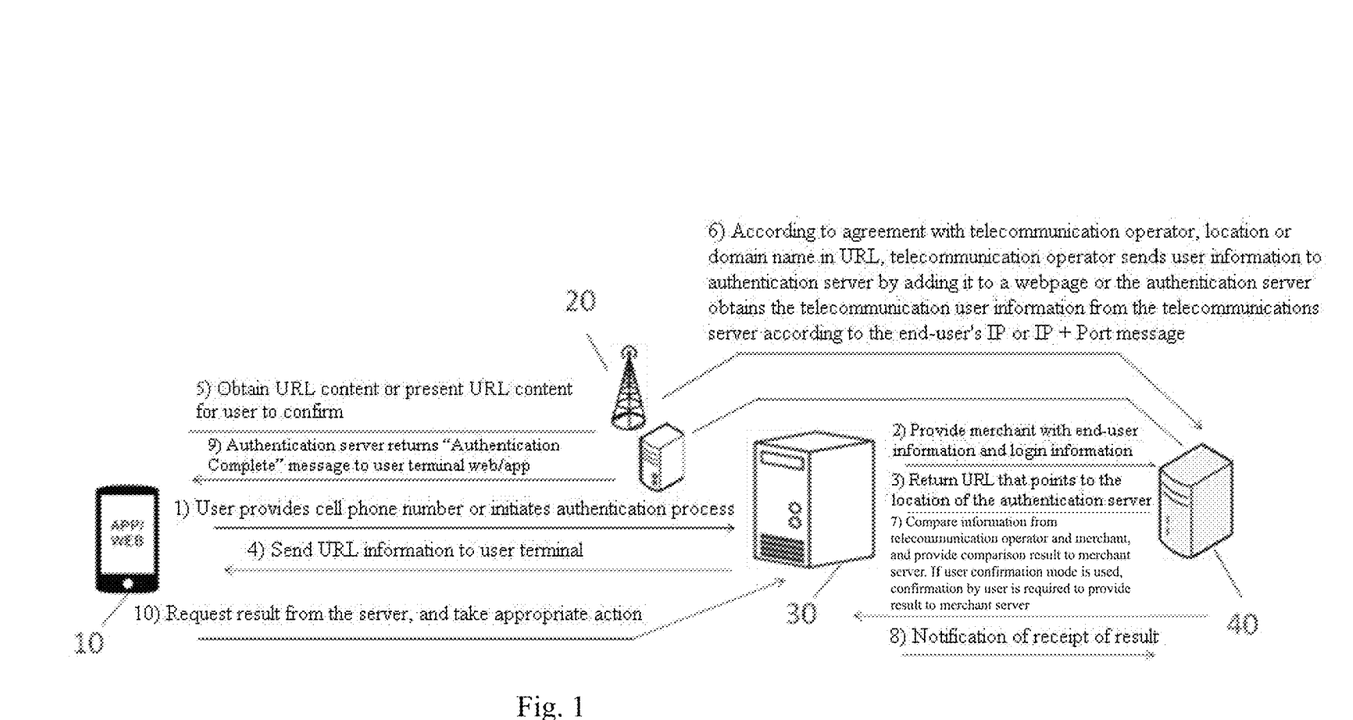
FIG. 1 is a system interaction diagram of the identity authentication according to an embodiment of the present disclosure.
Figure 2A:
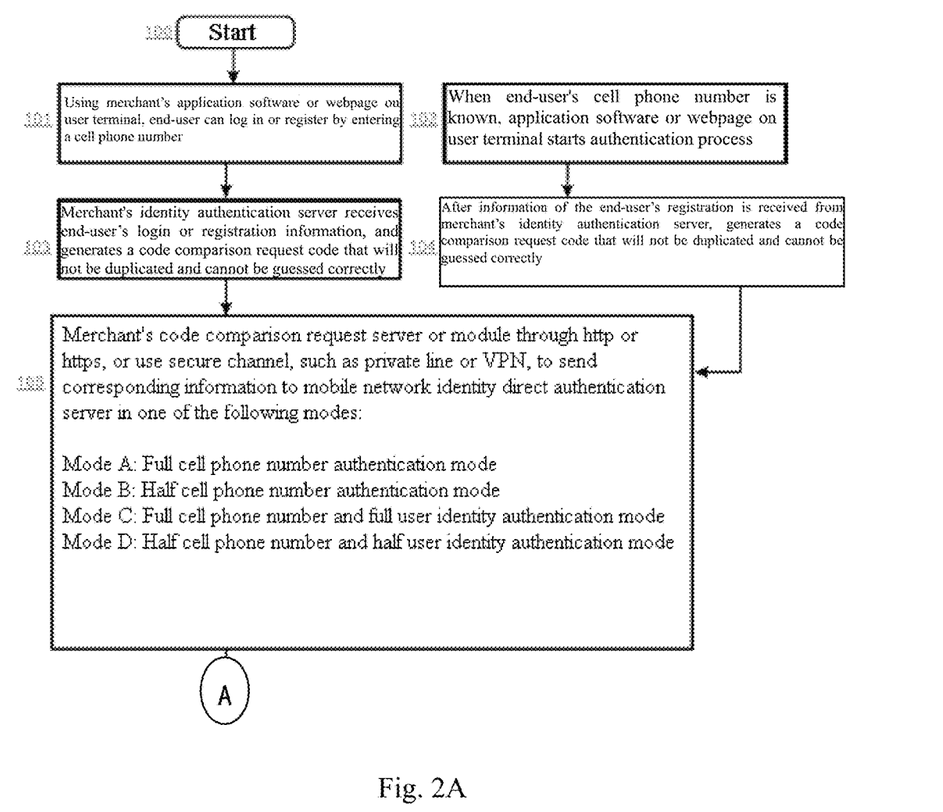
FIGS. 2A-2F are identity authentication flowcharts according to an embodiment of the present disclosure.
Figure 2B:
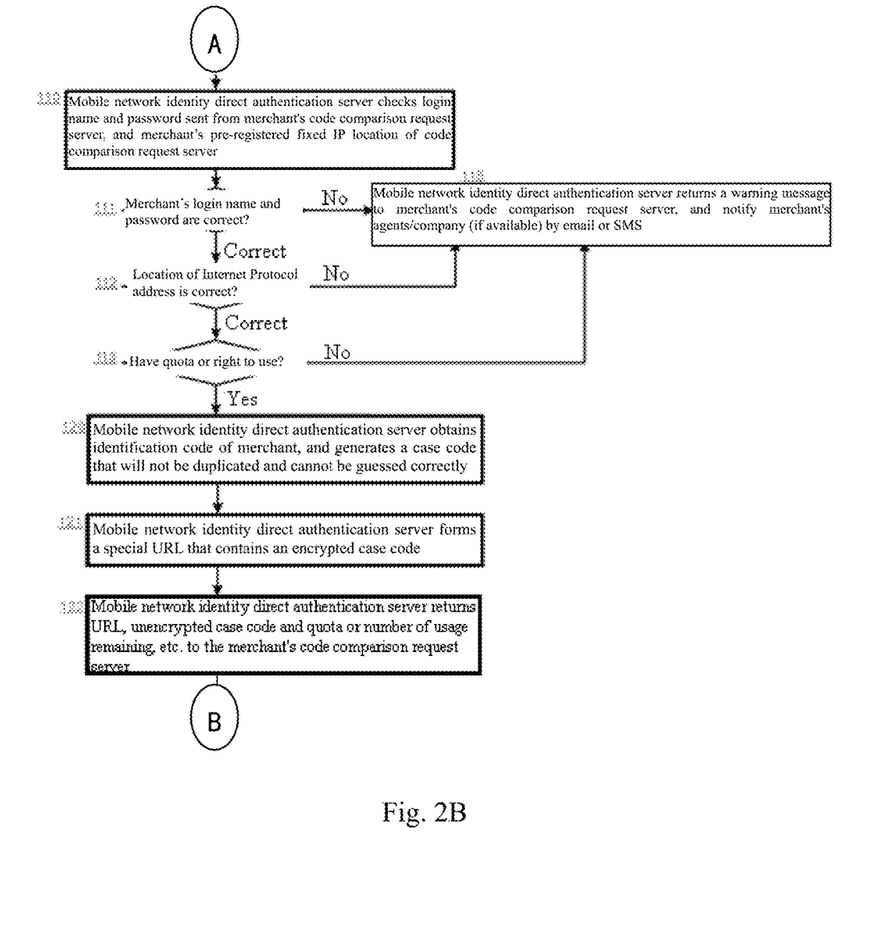
Figure 2C:
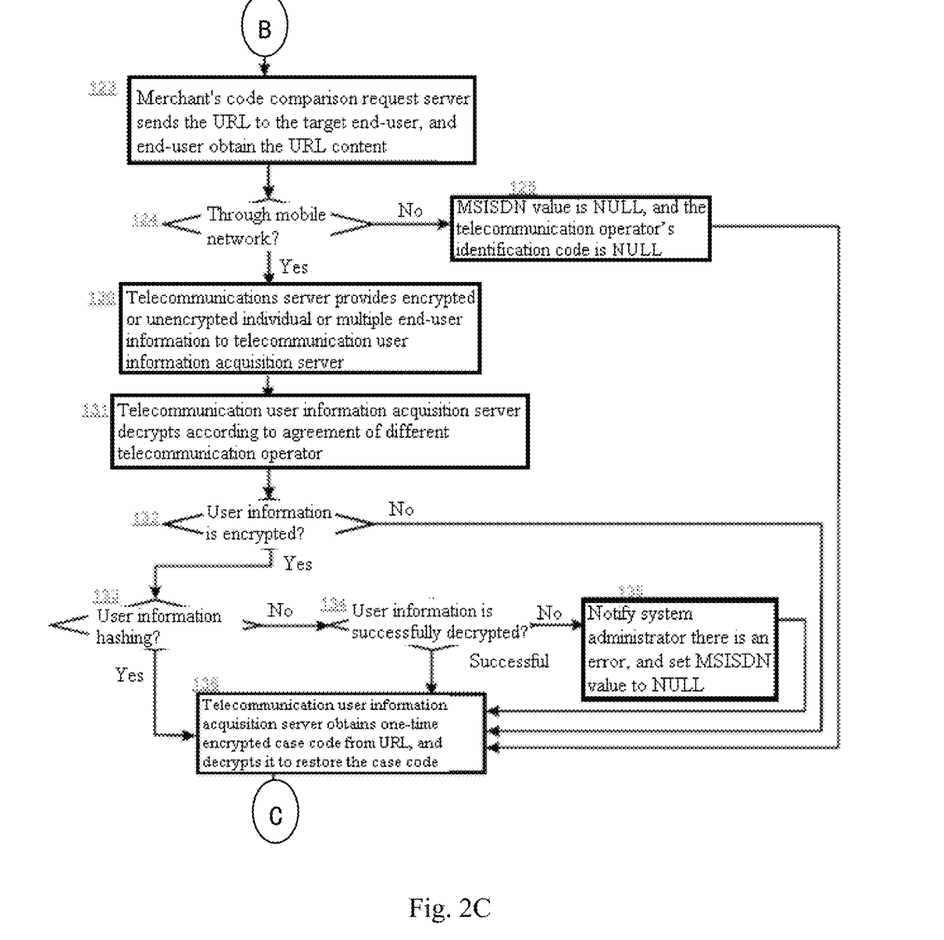
Figure 2D:
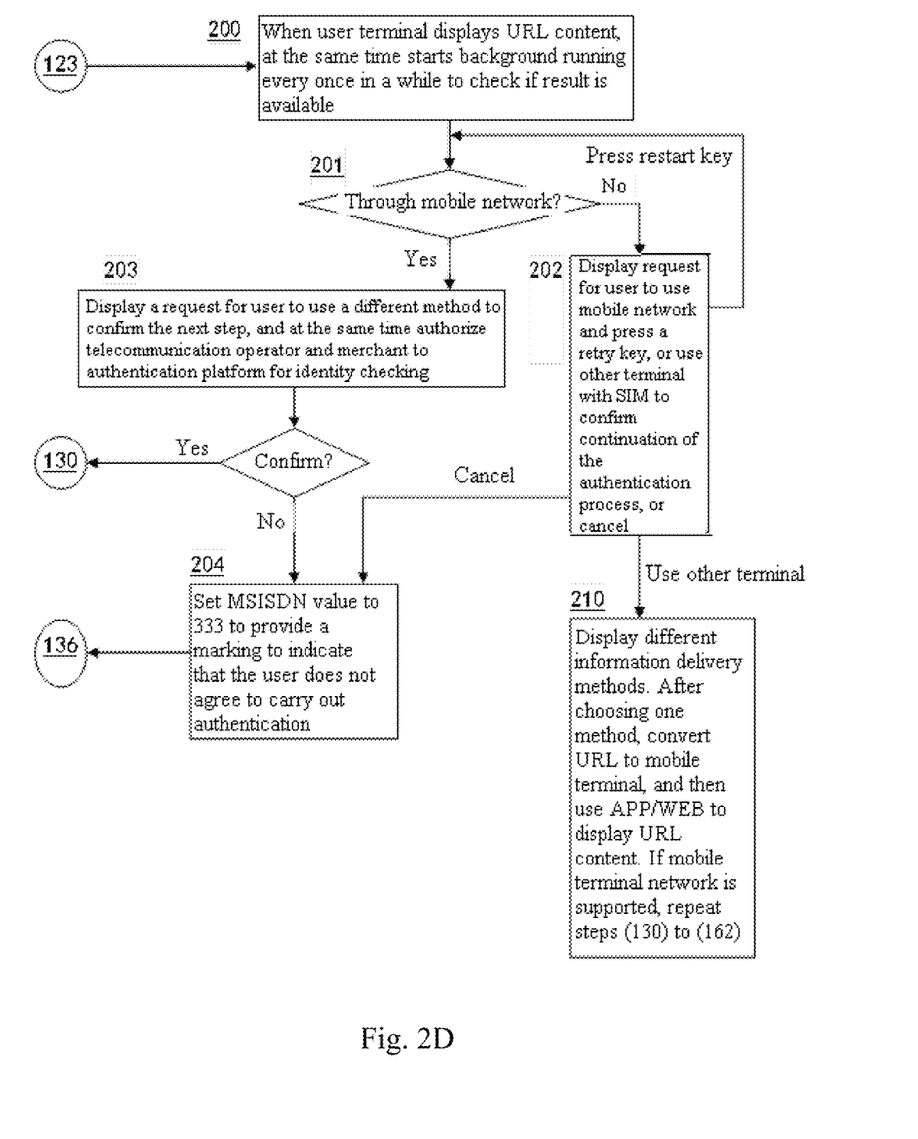
Figure 2E:
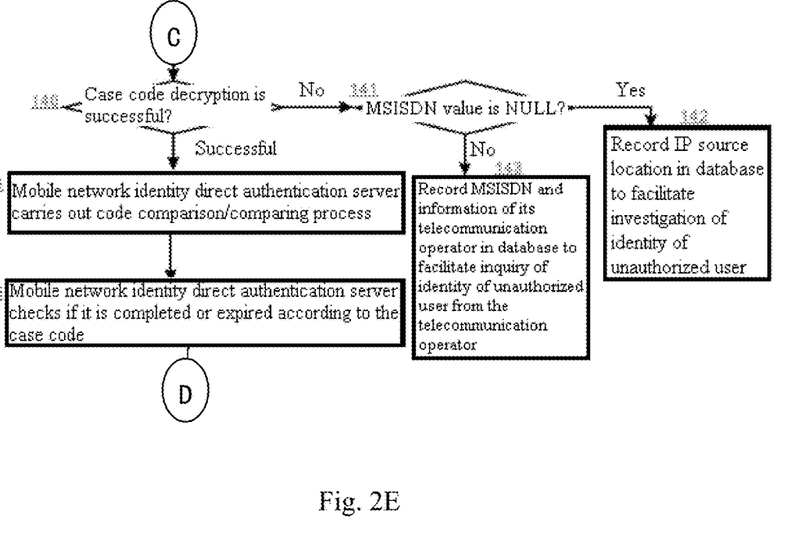
Figure 2F:
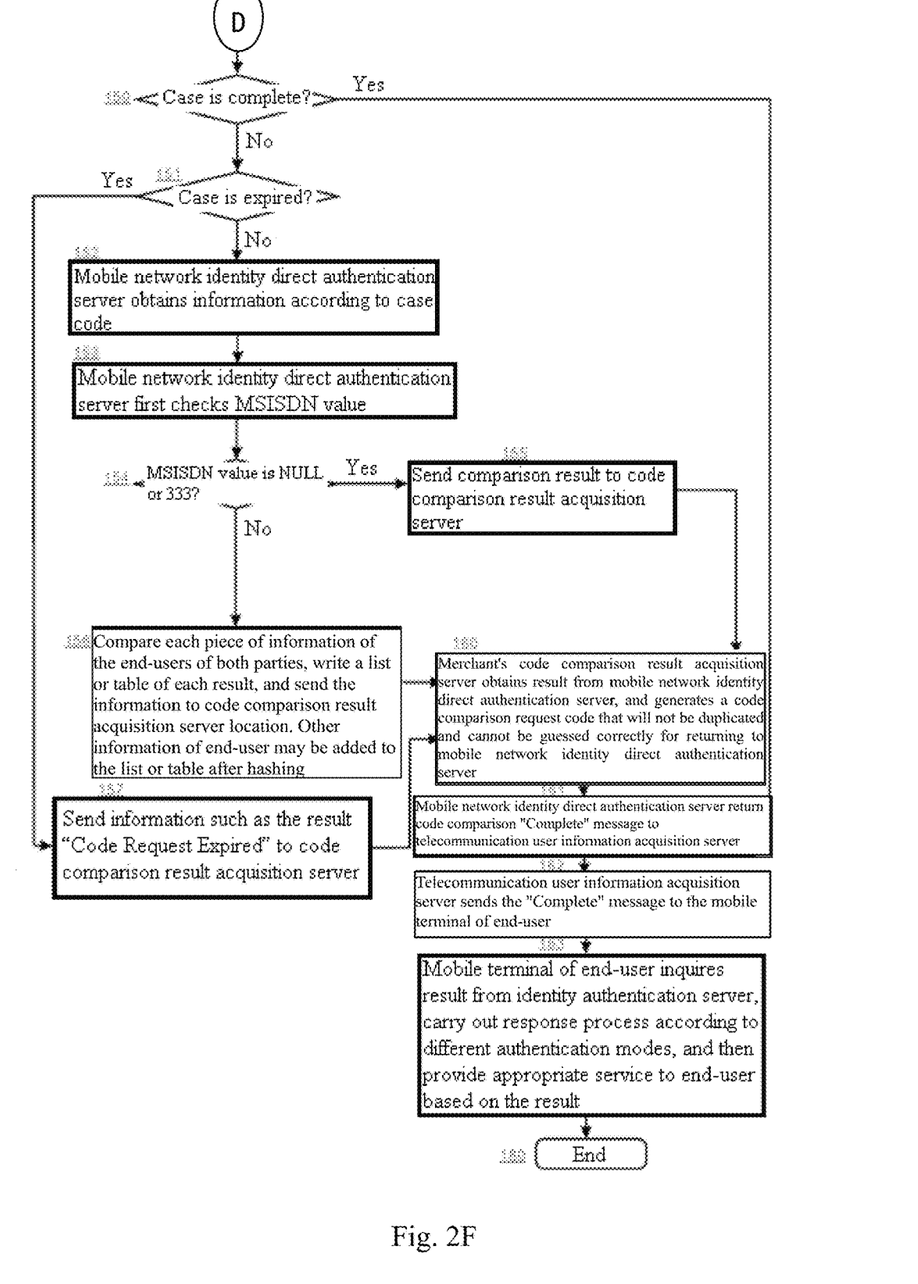

Referring to FIG. 1, the present disclosure provides an identity authentication system based on a telecommunication service provider and a mobile network. The entire authentication process is usually based on the interaction of four parties, including a user terminal (end-user) 10, a telecommunications server (telecommunication service provider) 20, a merchant server (APP or webpage content provider) 30, and an authentication server (authentication service provider) 40. The user terminal 10 can be a variety of computing devices, including processor and memory used by the end-user, such as desktop, laptop, tablet, smart phone (mobile terminal), etc. These devices can run various operating systems, such as Windows system, iOS system, Android system, etc. The main difference between the telecommunications server 20, the merchant server 30, and the authentication server 40 is that they are under different users. There is no real difference in hardware structure. A server typically includes a processor with powerful processing capability, as well as an array of memory with massive storage capability. The memory typically stores data in the form of a database that can manage information of a registered user. In addition, each of the above-mentioned three servers can be further subdivided, based on their execution capabilities. It should be understood that such subdivision is a logical subdivision. As far as physical entity is concerned, different execution capabilities can be performed by one server or by multiple different servers. For example, for the merchant server, it can be functionally differentiated into a code comparison request server, an identity authentication server, a code comparison result acquisition server, etc. As far as physical entity is concerned, these servers can be in the form of one server, or multiple servers. Similarly, for the authentication server, it can be functionally differentiated into a telecommunication user information acquisition server, a mobile network identity direct authentication server, etc. For physical entity, it can also be in the form of one server or multiple servers. Alternatively, the authentication server may include an information acquisition module and an identity authentication module. The information acquisition module can be used to obtain telecommunication user information from the telecommunications server and the merchant user information from the merchant server, based on the end-user's cell phone number. The identity authentication module can be used to compare the telecommunications user information with the merchant user information, according to a predetermined authentication mode, and return a comparison result to the merchant server. The capability of the information acquisition module and the identity authentication module can be implemented by the same processor or by different processors. Such a processor can be a DSP (digital signal processor), FPGA (field-programmable gate array), etc. It should be understood that the telecommunication user information and the merchant user information are differentiated only by their sources, i.e., the user information provided by the telecommunication service provider and the user information provided by the merchant. In fact, based on the same end-user (the same cell phone number), successful authentication condition is that the telecommunication user information and the merchant user information should be consistent in content, i.e. cell phone number, name, gender, and identity card number, etc.

The communication linkage of the four-party interaction can be implemented, as needed, with a wide range of familiar communication technologies. For example, for communication between a user terminal and a telecommunications server, it can be based on telecommunication networks arranged by a telecommunication service provider, such as GSM/3G/4G/5G . . . mobile networks. For communication between a user terminal and a merchant server, one can use APP or webpage via Internet, WiFi, etc. For communication between a merchant server and an authentication server, one can use the Internet, or a dedicated line (such as fiber) that is installed by the authentication service provider for the merchant, or VPN (virtual private network).

For communication between the telecommunications server and the authentication server, one can also use the Internet, or a dedicated line (such as fiber) that is installed by the authentication service provider for the merchant, or VPN (virtual private network).

The present disclosure mainly utilizes the cell phone number of an end-user as an authentication object. It is well known that the cell phone number is usually provided by the telecommunication service provider, so that participation of the telecommunication service provider is involved in the authentication process of the present disclosure. The telecommunication service provider, such as Telecom, China Mobile, and China Unicom, etc., provides users with telecommunication services. In addition, the authentication of the present disclosure is mainly to authenticate the user's service authority for each merchant, so that the participation of the merchant is involved. The business may include, for example, Bank of China which provides banking services to customers. Finally, the authentication core of the present disclosure lies in the application of the authentication service to a separate authentication service provider. Based on the above, as shown in FIG. 1, the four-party interaction in the authentication process of the present disclosure mainly includes:

1) User provides cell phone number or initiates authentication process:

In this step, authentication begins, and an end-user first uses the Internet on the user terminal to provide the merchant server with a cell phone number through App/webpage.

2) Provide the merchant with end-user information and login information:

In this step, according to the end-user cell phone number, the merchant server provides a corresponding merchant user information (non-encryption or protocol encryption method), as well as its own registered login information in the authentication server to the authentication server.

3) Return an URL that points to the location of the authentication server:

In this step, after obtaining the corresponding information, the authentication server returns to the merchant server an URL (Uniform Resource Locator). The URL specifically points to the telecommunication user information acquisition server in the authentication server, which contains an encrypted one-time token (case code).

4) Send URL information to user:

In this step, after obtaining the URL information, the merchant server sends it to the user terminal.

5) Obtain URL content or present URL content for user to confirm:

In this step, if user's confirmation is not required, based on the obtained URL information, user terminal can use JQuery, AJAX or similar method as background running to obtain the URL content (returned "Authentication Complete" message). However, if user's confirmation is required, the user terminal needs to use Webview or similar function to display the URL content for the user to confirm the authentication process.

6) According to the agreement with the telecommunication operator, the location or domain name (i.e., authentication server location) in the URL, the telecommunication operator sends the user information to the authentication server by a method of adding it to a webpage:

In this step, the telecommunications server can provide the user information to the authentication server by non-encryption or protocol encryption method, and adopt the method of adding the user information to a webpage, or the authentication server can request the user information from the telecommunication provider according to the user's IP or IP+Port message.

7) Compare information from telecommunication operator and merchant, and provide comparison result to merchant server:

In this step, the authentication server can compare the telecommunication user information obtained from the telecommunications server with the merchant user information obtained from the merchant server. According to different authentication modes, the authentication server can carry out corresponding comparisons. For example, when using authentication mode A (see below), the authentication server can compare each piece of information and return the result to the merchant server. Comparison result may include, for example, each piece of information matches, information do not match, or unable to provide (for example, authentication server is not authorized to obtain certain information, and unable to provide, etc.). If user confirmation mode is used, then confirmation by the user is required in order to provide the result to the merchant server.

8) Notification of receipt of result:

In this step, the merchant server can notify the authentication server that it has received the comparison result.

9) Authentication server returns "Authentication Complete" message to user terminal web/app:

In this step, the authentication server sends the "Authentication Complete" message to the telecommunications server. The telecommunications server then sends it to the user terminal. The message can be displayed on the user terminal through web/app, stating that the authentication process is complete.

10) Request result from the server, and take appropriate action:

In this step, the user terminal can request the result from the merchant server (after step 5 has started, request result from the merchant server once in a while to facilitate authentication using the user confirmation mode) in order to take appropriate action. In some authentication modes, such as authentication mode B (see below), the authentication server can only compare a part of the user information. The merchant server can check the other part of the user information on the basis of the comparison result of the authentication server.

Specifically, as shown in FIGS. 2A-2F, the authentication method provided by the embodiment of the present disclosure based on the telecommunication service provider and the mobile network may include:

(100) The authentication process begins. The process can then continue from step (101), or continue from step (102).

(101) Using merchant's application software or webpage on the user terminal, an end-user can log in or register by entering a cell phone number that includes the user's cell phone number MSISDN (Mobile Subscriber International ISDN number). Then, go to step (103).

(102) When the end-user's cell phone number and other personal information are known, the application software or webpage on the user terminal starts the authentication process. Then, go to step (104).

(103) The merchant's identity authentication server (as described above, which is part of the merchant server) receives the end-user's login or registration information, and generates a code comparison request code that will not be duplicated and cannot be guessed correctly according to one's preferences or in accordance with the following formula:

[Merchant 5 English word abbreviations+"-"+category (ASK=request)+MD5 (MSISDN cell phone number+GMT base time stamp+6-digit/letter random code)], where the GMT base time stamp is Greenwich mean time stamp. Then, go to step (105).

(104) After the information of the end-user's registration is retrieved from the merchant's identity authentication server, generates a code comparison request code that will not be duplicated and cannot be guessed correctly according to one's own preference or according to the following formula:

[Merchant 5 English word abbreviations+"-"+category (ASK=request)+MD5 (MSISDN cell phone number+GMT base time stamp+6-digit/letter random code)]. Then, go to step (105).

(105) Merchant's code comparison request server or module (as described before, which is part of the merchant server) through http or https, or use secure channel, such as private line or VPN, to send the corresponding information to the mobile network identity direct authentication server (as described previously, which is part of the authentication server) in one of the following modes. Then, go to step (110).

Mode A: Full Cell Phone Number Authentication Mode

This mode uses the mobile network identity direct authentication server to check the complete cell phone number MSISDN (i.e., full cell phone number), and will only return the result of the comparison. The basic description is as follows:
 (i) Authentication Mode: A
 (ii) Encryption: no or yes
 (iii) End-user information: MSISDN (cell phone number) [Select according to item (ii): If yes, then encrypt according to protocol encryption method]
 (iv) Login name and password of merchant (pre-registered in mobile network identity direct authentication server)
 (v) Code comparison request code
 (vi) Required validity period (based on seconds, maximum 300 seconds, preset to 10 seconds);
 (vii) Require end-user's confirmation: yes or no Mode B: Half Cell Home Number Authentication Mode This mode uses the mobile network identity direct authentication server to check part of the cell phone number MSISDN (i.e., half cell phone number). After the half cell phone number is checked to be correct, then return the end-user's full cell phone number provided by the telecommunication operator (non-encryption or protocol encryption method) to the merchant, and then check by the merchant. The advantage is that it can prevent abuse and the merchant can check the result. The basic description is as follows:
 (i) Authentication Mode: B
 (ii) Encryption: no or yes
 (iii) End-user information: part of the MSISDN (e.g.: last four digits) [Select according to item (ii): If yes, then encrypt according to protocol encryption method]
 (iv) Login name and password of merchant (pre-registered in the mobile network identity direct authentication server)
 (v) Code comparison request code
 (vi) Required validity period (based on seconds, maximum 300 seconds, preset to 10 seconds);
 (vii) Require end-user's confirmation: yes or no Mode C: Full Cell Phone Number and Full User Identity Authentication Mode This mode uses the mobile network identity direct authentication server to check the complete cell phone number MSISDN, name, and identity card number, etc, and will only return the result of the comparison. The basic description is as follows:
 (i) Authentication mode: C
 (ii) Encryption: No or yes
 (iii) End-user's information: MSISDN (cell mobile number), name, gender, date of birth and identity card number, etc. [Select according to item (ii): If yes, then encrypt according to protocol encryption method]
 (iv) login name and password of merchant (pre-registered in the mobile network identity direct authentication server)
 (v) Code comparison request code
 (vi) Required validity period (based on seconds, maximum 300 seconds, preset to 10 seconds);
 (vii) Require end-user's confirmation: yes or no Mode D: Half Cell Phone Number and Half User Identity Authentication Mode This mode uses the mobile network identity direct authentication server to check part of the cell phone number MSISDN and part of the identity card number. After part of the cell phone number and part of the identity card number are checked to be correct, return all of the end-user's information provided by the telecommunication operator (including complete cell phone number, identity card number, name, gender and date of birth, etc., unencrypted or encrypted according to protocol encryption method) to the merchant, and then check by the merchant. The advantage is that it can prevent abuse and the merchant can check the result. The basic description is as follows:
 (i) Authentication mode: D
 (ii) Encryption: no or yes
 (iii) End-user's information: part of MSISDN (e.g. last four digits) and part of the identity card number (e.g 6 digits in the middle), etc. [Select according to item (ii): If yes, then encrypt according to protocol encryption method]
 (iv) Merchant's login name and password (pre-registration in the mobile network identity direct authentication server)
 (v) Code comparison request code
 (vi) Required validity period (based on seconds, maximum 300 seconds, preset to 10 seconds)
 (vii) Require end-user's confirmation: yes or no (110) Mobile network identity direct authentication server checks the login name and password sent from the merchant's code comparison request server, and the merchant's pre-registered fixed IP location of the code comparison request server. Then, go to step (111).

(111) Check the merchant's login name and password. If there is an error, go to step (115); otherwise, go to step (112).

(112) Check the location of the Internet Protocol address in the merchant server. If there is an error, go to step (115); otherwise, go to step (113).

(113) Check whether there is any usage quota or right to use. If not, go to step (115); otherwise, go to step (120). The mobile network identity direct authentication server may assign the right to use or usage quota to the merchant. For example the merchant may have a permanent authentication service authority, or the merchant may only have certain usage quota of authentication service, etc.

(115) The mobile network identity direct authentication server returns a warning message to merchant's code comparison request server, and notify the merchant's agents/company (if available) by email or SMS. The process ends.

(120) After the mobile network identity direct authentication server has checked the identity of the merchant, obtain the identification code of the merchant from the database, and begin to generate a case code that will not be duplicated and cannot be guessed correctly:

[Mobile network identity direct authentication 3 English word abbreviations (DTA)+"–"+MD5 (merchant's identification code+MSISDN cell phone number+GMT base time stamp+6-digit/letter random code)]. Then, go to step (121).

(121) The mobile network identity direct authentication server encrypts the case code, selects the location of the most suitable or the least used telecommunication user information acquisition server (as described above, which is part of the authentication server), and forms a special URL that contains an encrypted case code. Then, go to step (122).

(122) The mobile network identity direct authentication server returns the following basic information to the merchant's code comparison request server:

(i) a special URL (Uniform Resource Locator) containing the encrypted case code;

(ii) an unencrypted case code (facilitate request for result later); and (iii) quota or number of usage remaining.

Then, go to step (123)

(123) The merchant's code comparison request server then sends the special URL page address that contains the one-time encrypted case code to the application software or webpage in the mobile terminal device of the target end-user. If confirmation from the end-user is not required in the authentication mode, then the end-user can use program such as AJAX or jQuery running in the background to obtain the URL content, and go to step (124). If confirmation from the end-user is required in the authentication mode, then go to step (200).

(200) When the end-user uses technology such as Webview to display the URL content, at the same time starts background running every once in a while, e.g. 1 second, to check with the merchant server whether a result is available. If yes, go to step (163).

(201) Determine if there is a chance for the information to connect to the Internet World Wide Web through a telecommunication mobile network. If no, go to step (202); and if yes, go to step (203).

(202) Display a request for user to use a mobile network or use other terminal with SIM to confirm continuation of the authentication process. If a retry key is pressed, then return to step (201). If a terminal with SIM is chosen to confirm continuation of the authentication process, then go to step (210). If cancellation is chosen, then go to step (204).

(203) Display a request for user to use a different method (drag bar, CAPTCHA, etc.) to confirm the next step, and at the same time authorize the telecommunication operator and the merchant to provide information to the authentication platform for identity checking. If the user confirms, then go to step (130). If the user does not confirm, then go to step (204).

(204) Set MSISDN value to 333 to provide a marking to indicate that the user does not agree to carry out authentication, and go to step (136).

(210) Display different information delivery methods (e.g. two-dimensional code, QR Code, NFC, P2P App (WhatsApp, WeChat, Line, Messenger, and so on), etc.) After choosing one of the methods, convert the URL to the mobile terminal using the mobile terminal's two-dimensional code scan program, NFC (near-field communication) reception program, etc., or send the URL to other people through P2P App to ask for authorization. Thereafter use App or webpage program to display the content of the URL, or click the URL in the P2P App to open and display the content of the URL. If the mobile terminal network is supported, then repeat steps (130) to (162).

(124) Determine if there is a chance for the information to connect to the Internet World Wide Web through a telecommunication mobile network. If no, go to step (125); and if yes, go to step (130).

(125) If mobile network is not used, the MSISDN value is NULL, and the telecommunication operator's identification code is NULL, then go to step (136).

(130) If it is through an agreed telecommunication mobile network, the telecommunications server will provide encrypted or unencrypted individual end-user information (MSISDN) or multiple end-user information (MSISDN, name, gender, and partial identity card number, etc.) to the telecommunication user information acquisition server. For encryption method, additional encrypted partial cell phone number MSISDN will be provided to facilitate authentication in modes B and D. Additional encrypted partial identity card number will be provided to facilitate authentication in mode D. The methods that are provided include:

(i) Method one: add user information at different locations in the header (http/https).

(ii) Method two: Use internet protocol address or internet protocol address+communication port to inquire about the end-user's information from other telecommunications server. Then, go to step (131).

(131) If the obtained end-user information is encrypted, the telecommunication user information acquisition server will decrypt according to agreement of different telecommunication operator. If the agreement is to use HASHING for encryption, decryption is not required. The HASHING value is compared. Then, go to step (132).

(132) Check whether the end-user information is encrypted. If yes, go to step (133); otherwise go to step (136).

(133) Check whether the end-user information for HASHING. If yes, go to step (136); if not, go to step (134).

(134) Check whether the end-user information is successfully decrypted. If successful, go to step (136); if not, go to step (135).

(135) Notify the system administrator by email that there is an error in the decryption method provided by the telecommunication operator that corresponds to the end-user information to be decrypted, and set the MSISDN value to NULL, and the telecommunication operator's identification code to NULL. Then, go to step (136).

(136) Telecommunication user information acquisition server obtains a one-time encrypted case code from the special URL, and then decrypts it to restore the case code. The purpose is to test whether it is its own code, as well as reduce external interference or impact on the system. Then, go to step (140).

(140) Check whether the case code decryption if successful. If not successful, go to step (141); and if successful, go to step (144).

(141) Check whether the MSISDN value is NULL. If yes, go to step (142); and if no, go to step (143).

(142) Record the IP source location in the database to facilitate investigation of the identity of unauthorized user. The process is ended.

(143) Record MSISDN and the information of its telecommunication operator in the database to facilitate inquiry of the identity of unauthorized user from the telecommunication operator. The process is ended.

(144) After successful case code decryption, the telecommunications user information acquisition server will send the end-user information, case code and telecommunication operator's identification code to the mobile network identity direct authentication server for carrying out code comparison/comparing process. Then, go to step (145).

(145) The mobile network identity direct authentication server checks whether it is completed or expired according to the case code. Then, go to step (150).

(150) Check whether the case is complete. If yes, jump to step (161); otherwise, go to step (151).

(151) Check whether the case is expired. If yes, jump to step (157); otherwise, go to step (152).

(152) If the case has not expired, then according to the case code, the mobile network identity direct authentication server obtains information such as authentication mode, processed by encryption or not, merchant's identification code, location of the code comparison result acquisition server during merchant's registration, code comparison request code, and end-user information to be compared, etc. Then, go to step (153).

(153) Mobile network identity direct authentication server first checks the MSISDN value. Then, go to step (154).

(154) Check whether the MSISDN value is NULL or 333. If yes, go to step (155); otherwise, go to step (156).

(155) Send information such as comparison result (e.g. If the MSISDN value is NULL, the result is "Not Available", or the MSISDN valve is 333, the result is "User Does Not Agree"), code comparison request code, case code, etc. to the code comparison result acquisition server at the time of the merchant's registration (as mentioned above, which is part of the merchant server). Then, go to step (160).

(156) compare each piece of information of the end-users of both parties, write a list or table of each result "Match" or "Do Not Match" and information category, and send the information such as authentication mode, processed by encryption or not, code comparison request code, case code, etc. to the code comparison result acquisition server location at the time of the merchant's registration. If it is authentication mode B, and a part of the cell phone number is correct, then the end-user's full cell phone number provided by the communication operator (non-encryption or protocol encryption method) is added to the list or table. In response to request, other information of the end-user may be added to the list or table after HASHING. Then, go to step (160).

(157) Send information such as the result "Code Request Expired", code comparison request code, case code, etc. to the code comparison result acquisition server location at the time of the merchant's registration. Then, go to step (160).

(160) The merchant's code comparison result acquisition server or module obtains result from the mobile network identity direct authentication server, and starts generating a code comparison result acquisition code that will not be duplicated and cannot be guessed correctly according to one's own preference or according to the following formula for returning to the mobile network identity direct authentication server:

[Merchant 5 English word abbreviations+"−"+category (GET=obtain)+MD5 (MSISDN cell phone number+GMT base time stamp+6-digit/letter random code)]. Then, go to step (161).

(161) After the mobile network identity direct authentication server obtains the code comparison result acquisition code sent from the merchant, confirm that the merchant has a stub, ensure that the result message is received, and return the code comparison "Complete" message to the telecommunication user information acquisition server. Then, go to step (162).

(162) Telecommunication user information acquisition server then sends the "Complete" message to the application software or webpage in the mobile terminal of the end-user. Then, go to step (163).

(163) The application software or webpage in the mobile terminal of the end-user sends inquiry of result to the identity authentication server (If user's confirmation option is chosen, then it needs to display the content of the webpage, i.e., send the inquiry of result every once in a while, because it is not known when the user will confirm). If the authentication mode is A or C, then based on the result from the mobile network identity direct authentication server, provide the user with the appropriate service or information, such as "All Match", i.e. allow the user to log in, register, or go to the next step; "Do Not Match", i.e. require the user to check and provide correct user information, such as cell phone number MSISDN or name, etc.; "Unable To Provide", i.e. request or wait for the user to verify again when using the telecommunication network; "User Disagrees", i.e. prompt the user again the need to confirm according to instructions; "Code Request Expired", i.e. start the process again. If the mode is B, and "Match" the partial cell phone number of both parties, the merchant can also check the complete cell phone number from the mobile network identity direct authentication server (non-encryption or protocol encryption method) and the cell phone number of the end-user stored by the merchant itself in order to ensure that the result is accurate, and then provide the appropriate service to the end-user according to the result. If the mode is D, and "Match" the partial cell phone number and partial identity card number of both parties, the merchant can also check the complete end-user information from the mobile network identity direct authenticated server (non-encryption or protocol encryption method), and the end-user information stored by the merchant itself in order to ensure that the result is accurate, and then provide the appropriate service to the end-user based on the result. Then, go to step (180).

(180) End.

The authentication system or platform implemented by the present disclosure is characterized in that important information such as the information of the code comparison and result can be communicated between the background server and the servers. This can avoid trojan in the mobile terminal, invasion by middleman, virus, or crack of the user's software, which may lead to issues such as fake result. By using telecommunication information authentication technology, a user can achieve better security, rapid authentication, better user experience, and can avoid security issue such as repeat SMS interception. In addition, even if messages are to be passed through the telecommunication network, the telecommunication operator does not know what end-user information is to be compared by the merchant because those messages do not carry the end-user information. This can ensure the reliability of the information provided by the telecommunication operator. Furthermore, if both parties use HASHING or other encryption methods to encrypt the user information, and have it compared by the platform, it will not cause leakage of the user information even if this platform is hacked. If authentication mode B or D is chosen, the merchant does not fully disclose the end-user information to the authentication platform. On one hand, this can improve the credibility of the authentication platform, and on the other hand, the merchant can also check the result. This can achieve double insurance. The authentication platform will not be abused. This can maximize the protection of the end-user's personal information. In addition, this authentication method can choose to display the URL content on the user terminal, and let the end-user know the authentication, and press a key to go to the next step. This adds an extra checking step so as to prevent the URL from being hijacked by hackers. Furthermore, a user can use other terminal devices with SIM for mobile authentication, or send the URL (request) to other people's terminal devices with SIM for other mobile authorization. This can increase authentication and authorization flexibility, especially in those devices without SIM, such as PC, PAD, etc.

The present method and platform can make mobile terminal reliable and unique. Even using a simple password, it does not pose a risk of being stolen by trojan, middleman or virus. In addition, the present method and platform can solve the problem of "you are you" and "who are you (know your customer)". It can be well applied to the field of mobile communication. It is advantage in that:

1) If hidden URL running mode is chosen (i.e. user is not required to confirm by pressing a key), then no need for a user to enter a one-time password.

2) If hidden URL running mode is chosen (i.e. user is not required to confirm by pressing a key), then so long as the user's cell phone number is known, checking can be carried out at any time.

3) Instant knowledge of comparison result, 5-15 times faster than SMS authentication.

4) Know whether the phone's SIM card and APP are on the same phone, and increase security.

5) Can assist SMS authentication, strengthen the status of cell phone number authentication, and increase the value of using the telecommunication network Internet by the user.

6) If display URL running mode is chosen (i.e. user is required to confirm by pressing a key), then additional security and authorization message are added (explicit confirmation by the user can be achieved). It also allows a user to convert to a device with SIM for authentication processing, or send the URL to other people through P2P App (WhatsApp, WeChat, and so on) for authorization. This does not affect the original operating device, and can increases flexibility.

7) Generally speaking, the telecommunication information can be provided directly to the merchant as long as confirmation or authorization is obtained from the user. However, there is a risk that the telecommunication information may not be 100% reliable. Furthermore, the user may use more than one SIM card on the mobile terminal. The user may not know which cell phone number is to be used for registration. Hence, by using the code comparison checking method, one can determine what information the user wants to provide to open an account or register. Telecommunication information can be used as a check for user information, so that the user can eliminate unnecessary misuse or error when providing information. In addition, we often log in some services and forget to log out before leaving, especially in public place or after using a personal computer or an immobile terminal. This creates some security concerns. For this type of problem, through a special webpage or APP, and through the authentication method, the user's cell phone number is verified. Successful transaction code (case code) in the past can be displayed through the cell phone number. As long as the user cancels a transaction code, the system will identify the relevant merchant information based on the transaction code, and issue a user service cancellation request and transaction code to the merchant server. When the merchant server receives the transaction code of the service to be cancelled, and if the service still continues, the service will be withdrawn, thereby protecting the real user.

Although this patent application provides a detailed description of the various modes of implementation in conjunction with the accompanying drawings, it should be noted that all other possible changes or modifications shall be included in the present disclosure without departing from the scope of protection of the disclosure.

What is claimed is:

1. A hardware authentication server, comprising:
a processor; and
a memory having instructions stored thereon;
wherein the instructions, when executed by the processor, cause the processor to obtain telecommunication user information from a hardware telecommunications server, and obtain merchant user information from a hardware merchant server, based on an end-user's cell phone number; and compare the telecommunication user information with the merchant user information according to a predetermined authentication mode, and return a comparison result to the merchant server;
wherein the authentication mode comprises: full cell phone number authentication mode, half cell phone number authentication mode, full cell phone number and full user information authentication mode, and half cell phone number and half user information authentication mode;
wherein when in the half cell phone number authentication mode, or the half cell phone number and half user information authentication mode, the merchant server continues to carry out comparison of a complete cell phone number and user information.

2. An authentication system, comprising:
a hardware telecommunications server;
a hardware authentication server; and
a hardware merchant server,
wherein the telecommunications server provides telecommunication user information to the authentication server based on an end-user's cell phone number, the merchant server provides merchant user information to the authentication server based on the end-user's cell phone number, and the authentication server compares the telecommunication user information obtained from the telecommunications server, and the merchant user information obtained from the merchant server according to a predetermined authentication mode, and returns a comparison result to the merchant server;
wherein the authentication mode comprises: full cell phone number authentication mode, half cell phone number authentication mode, full cell phone number and full user information authentication mode, and half cell phone number and half user information authentication mode;
wherein when in the half cell phone number authentication mode, or the half cell phone number and half user information authentication mode, the merchant server continues to carry out comparison of a complete cell phone number and user information.

3. The authentication system according to claim 2, wherein the telecommunications server uses a method of adding user information to a webpage to provide the telecommunication user information to the authentication server, or the authentication server obtains the telecommunication user information from the telecommunications server according to the end-user's IP or IP+Port message.

4. An authentication method, comprising:
providing, by a hardware merchant server, merchant user information to a hardware authentication server based on an end-user's cell phone number;
providing, by a hardware telecommunications server, telecommunication user information to the authentication server based on the end-user's cell phone number; and
carrying out, by the authentication server, comparison of the telecommunication user information obtained from the telecommunications server and the merchant user information obtained from the merchant server according to a predetermined authentication mode, and returning a comparison result to the merchant server;
wherein the authentication mode comprises: full cell phone number authentication mode, half cell phone number authentication mode, full cell phone number and full user information authentication mode, and half cell phone number and half user information authentication mode;

wherein when in the half cell phone number authentication mode, or the half cell phone number and half user information authentication mode, the merchant server continues to carry out comparison of a complete cell phone number and user information.

5. The authentication method according to claim 4, wherein the authentication method comprises:
generating, by the merchant server, a code comparison request code which contains a merchant abbreviation, the end-user's cell phone number, a time stamp and a random code;
sending the code comparison request code and its corresponding merchant user information to the authentication server according to the authentication mode;
generating a case code which contains an authentication abbreviation, a merchant identification code, a time stamp and a random code, after the authentication server confirms the merchant's identity and authority, forming a uniform resource locator which contains an encrypted case code, and sending information of the case code, the uniform resource locator, and remaining right to use or usage quota to the merchant server;
transferring, by the merchant server, the uniform resource locator to the user's terminal;
providing, by the telecommunications server, corresponding telecommunication user information to the authentication server according to a request by the end-user based on the uniform resource locator;
carrying out, by the authentication server, comparison of the telecommunication user information and the merchant user information based on the encrypted case code obtained from the uniform resource locator after successful completion of decryption and checking, and sending a comparison result to the merchant server; and
carrying out corresponding processing according to the authentication mode after the merchant server obtains the comparison result from the authentication server.

\* \* \* \* \*